US011728686B2

(12) United States Patent
Thorstensen et al.

(10) Patent No.: US 11,728,686 B2
(45) Date of Patent: Aug. 15, 2023

(54) WIRELESS CHARGING OF DEVICES (71) Applicant: SINTEF TTO AS, Trondheim (NO)

(72) Inventors: Jostein Thorstensen, Trondheim (NO); Tobias Gulden Dahl, Trondheim (NO)

(73) Assignee: SINTEF TTO AS, Trondheim (NO)

(*) Notice: Subject to any disclaimer, the term of this patent is extended or adjusted under 35 U.S.C. 154(b) by 0 days.

(21) Appl. No.: 17/764,350

(22) PCT Filed: Sep. 30, 2020

(86) PCT No.: PCT/GB2020/052362
§ 371 (c)(1),
(2) Date: Mar. 28, 2022

(87) PCT Pub. No.: WO2021/064368
PCT Pub. Date: Apr. 8, 2021

(65) Prior Publication Data
US 2022/0352759 A1 Nov. 3, 2022

(30) Foreign Application Priority Data
Sep. 30, 2019 (GB) ........................... 1914045

(51) Int. Cl.
*H02J 50/30* (2016.01)
*H04B 10/80* (2013.01)
(Continued)

(52) U.S. Cl.
CPC ............... *H02J 50/30* (2016.02); *H02J 7/35* (2013.01); *H02J 50/402* (2020.01); *H02J 50/80* (2016.02);
(Continued)

(58) Field of Classification Search
CPC .......... H02J 50/30; H02J 50/80; H02J 50/402; H02J 7/35; H02J 2300/24; H04B 10/29; H04B 10/807; H04B 10/80
See application file for complete search history.

(56) References Cited

U.S. PATENT DOCUMENTS 5,982,139 A 11/1999 Parise
2005/0190427 A1 9/2005 Steinsiek et al.
(Continued)

FOREIGN PATENT DOCUMENTS

DE 102014205750 A1 10/2015
DE 102017220588 A1 5/2019
(Continued)

OTHER PUBLICATIONS

Crocco, M. et al., "Room Impulse Response Estimation by Iterative Weighted L1-NORM," 23rd European Signal Processing Conference (EUSIPCO), Aug. 31-Sep. 4, 2015, Nice, France, IEEE, 5 pages.
(Continued)

*Primary Examiner* — Robert L Deberadinis
(74) *Attorney, Agent, or Firm* — Withrow & Terranova, P.L.L.C.; Vincent K. Gustafson (57) ABSTRACT

Disclosed is a method of operating an array of receiver devices as a phased array. The receiver devices are in a fixed mutual relationship within a zone and each receiver device comprises a photovoltaic element. The method involves receiving a signal from within the zone at a plurality of the receiver devices to generate a plurality of received signals and processing the received signals using at least one phase difference therebetween. The method also involves directing a beam of light from a unit located within the zone to the photovoltaic elements, thereby providing power to said receiver devices. The invention extends to an array of (Continued)

transmitter devices and to an array of both transmitter and receiver devices.

20 Claims, 10 Drawing Sheets

(51) Int. Cl.
  *H02J 50/80* (2016.01)
  *H02J 50/40* (2016.01)
  *H02J 7/35* (2006.01)
  *H04B 10/29* (2013.01)
(52) U.S. Cl.
  CPC .......... *H04B 10/29* (2013.01); *H04B 10/807* (2013.01); *H02J 2300/24* (2020.01)

(56) References Cited

U.S. PATENT DOCUMENTS

| | | |
|---|---|---|
| 2006/0060651 A1 | 3/2006 | McIntyre et al. |
| 2008/0084596 A1 | 4/2008 | Graham |
| 2010/0079009 A1 | 4/2010 | Hyde et al. |
| 2015/0340875 A1 | 4/2015 | Mahameed et al. |
| 2016/0344226 A1 | 11/2016 | Wu et al. |
| 2017/0093228 A1 | 3/2017 | Fisher et al. |
| 2017/0183095 A1 | 6/2017 | Liu et al. |
| 2019/0229558 A1 | 7/2019 | Pigeon et al. |
| 2020/0091774 A1 | 3/2020 | Kim et al. |

FOREIGN PATENT DOCUMENTS

| | | |
|---|---|---|
| EP | 2879402 A1 | 6/2015 |
| WO | 2017025125 A1 | 2/2017 |

OTHER PUBLICATIONS

Dobler, D. et al., "Automatic Detection of Microphone Coordinates," Bedin Beamforming Conference, Feb. 24-25, 2010, 11 pages.

Mofrad, R. et al., "Antenna Beam Broadening in Multifunction Phased Array Radar," Acta Physica Polonica A, vol. 119, No. 4, Apr. 2011, 6 pages.

Lim, J. et al., "Wireless optical power transfer system by spatial wavelength division and distributed laser cavity resonance," Optics Express, vol. 27, No. 12, Jun. 10, 2019, 12 pages.

International Search Report and Written Opinion for International Patent Application No. PCT/GB2020/052362, dated Dec. 4, 2020, 15 pages.

International Search Report and Written Opinion for International Patent Application No. PCT/GB2021/051229, dated Aug. 16, 2021, 13 pages.

International Search Report and Written Opinion for International Patent Application No. PCT/GB2021/051230, dated Aug. 11, 2021, 14 pages.

International Search Report and Written Opinion for International Patent Application No. PCT/GB2021/051231, dated Aug. 16, 2021, 14 pages.

WIRELESS CHARGING OF DEVICES

This application is a 35 U.S.C. § 371 national phase filing of International Application No. PCT/GB2020/052362 filed on Sep. 30, 2020, and claims the benefit of United Kingdom Patent Application No. 1914045.8 filed on Sep. 30, 2019, wherein the disclosures of the foregoing applications are hereby incorporated by reference herein in their respective entireties.

With the continued proliferation of electronic devices, particularly those where it is not convenient or possible to provide a permanent wired connection to a mains power supply, and growing expectations for the functionality and battery life that these provide, there remains an important focus on how such devices are charged.

There have been a number of developments in charging technology in recent years, most notably the introduction of magnetic induction charging to avoid the need for a physical coupling between the charger and the device being charged. Whilst this technology may be well suited to personal portable devices such as smart phones, smart watches, tablets etc, the need for a close physical proximity between the device and the charging surface does not make this technology suitable in all circumstances.

There have also been proposals to use lasers to provide power to charge devices by using the laser to illuminate a suitable photocell on the device. This has the advantage of removing the need for the device to be held close to a charging surface. However it suffers from some significant drawbacks. One of these is the requirement to have in place a suitable feedback system to ensure alignment between the laser and the photocell. Another is that a line of sight is required between the charging unit and the device which may cause difficulties in some environments or mean that additional charging units are needed.

Most significantly however, is that the above-mentioned laser charging methods are only capable of providing low charging currents. On one hand, although there are steady improvements being made, the efficiency of photovoltaic cells is still in general a long way below the theoretical maximum. On the other hand, there are stringent safety restrictions on the power levels for lasers that can be used in ordinary public, workplace or domestic settings.

For these and other reasons, the aforementioned remote laser charging has yet to be widely adopted.

When viewed from a first aspect the invention provides a method of operating an array of receiver devices as a phased array, wherein said receiver devices are in a fixed mutual relationship within a zone and each receiver device comprises a photovoltaic element, said method comprising receiving a signal from within the zone at a plurality of said receiver devices to generate a plurality of received signals and processing said received signals using at least one phase difference therebetween, said method further comprising directing a beam of light from a unit located within the zone to said photovoltaic elements, thereby providing power to said receiver devices.

This aspect of the invention extends to a system comprising an array of receiver devices arranged to operate as a phased array, wherein said receiver devices are in a fixed mutual relationship within a zone and each receiver device comprises a photovoltaic element, said system being arranged to receive a signal from within the zone at a plurality of said receiver devices to generate a plurality of received signals and to process said received signals using at least one phase difference therebetween, said system further comprising a unit located within the zone arranged to direct a beam of light to said photovoltaic elements, thereby providing power to said receiver devices.

When viewed from a second aspect the invention provides a method of operating an array of transmitter devices as a phased array, wherein said transmitter devices are in a fixed mutual relationship within a zone and each transmitter device comprises a photovoltaic element, said method comprising transmitting a plurality of transmitted signals into the zone from a plurality of said transmitter devices wherein said transmitted signals have at least one predetermined phase difference therebetween, said method further comprising directing a beam of light from a unit located within the zone to said photovoltaic elements, thereby providing power to said transmitter devices.

This aspect of the invention extends to a system comprising an array of transmitter devices arranged to operate as a phased array, wherein said transmitter devices are in a fixed mutual relationship within a zone and each transmitter device comprises a photovoltaic element, said system being arranged to transmit a plurality of transmitted signals into the zone from a plurality of said transmitter devices wherein said transmitted signals have at least one predetermined phase difference therebetween, said system further comprising a unit located within the zone arranged to direct a beam of light to said photovoltaic elements, thereby providing power to said transmitter devices.

Thus it will be seen by those skilled in the art that, in accordance with the invention, phased arrays of transducers, i.e. transmitters and/or receivers, work together by receiving or generating signals having phase offsets which can be used to provide effects that are not achievable with isolated transducers as will be described in further detail hereinbelow. The Applicant has appreciated that this a particularly beneficial application which is opened up when devices can be charged using a light beam and photovoltaic elements as described herein as it allows a relatively large number of transducers to be provided which can be charged from one, or a small number, of light sources. Having to charge them separately, change batteries in each or hard-wire them would typically be prohibitive. The Applicant has appreciated that the larger the number of devices in the array, the greater the functionality and performance which may be achieved. For example using the devices in an array distributed over a relatively large area (such as a room) rather than being confined to a particular electronic appliance means that the array may have a large baseline which may help to give advantageous performance in terms of the ability to focus in on one source while suppressing others.

Having the devices in a fixed mutual relationship significantly reduces the practical difficulties of implementing a remote charging system as problems relating to alignment, occlusion etc. that arise when charging mobile devices may be avoided. It also allows knowledge of the positions of the devices (which may be acquired on installation or only occasionally) to be used in the processing of the signals received or in the transmission of the signals without having to determine the relative positions of the devices every time.

The transmitters could be of any appropriate type—e.g. for transmitting light, radio waves, radar etc. In a set of embodiments the transmitters comprise loudspeakers such that sound is transmitted. This would enable sound to be delivered to a specific part only of the zone by employing beamforming for example. In a set of such embodiments the sound is audible sound. One application of this might be to deliver personalised audio to a person in the zone that can only be heard by them but not others in the zone. In another set of such embodiments (which need not be mutually exclusive) the sound is ultrasound. Some possible applications of this are discussed below.

The receivers could be of any appropriate type—e.g. for receiving light, radio waves, radar etc. In a set of embodiments the receivers comprise microphones such that sound is received. This would enable sound to be picked up from a specific part only of the zone by employing beamforming for example. In a set of such embodiments the sound is audible sound. One application of this might be to listen to speech from a person in the zone but not from other people or sound sources in the zone. This could for example be used for communication or to isolate a person interacting with a voice-controlled system. In another set of such embodiments (which need not be mutually exclusive) the sound is ultrasound. Some possible applications of this are discussed below.

In a set of embodiments both transmitters and receivers are used. They could be independent of each other but in a set of embodiments they form part of a common system. In an exemplary set of embodiments bringing together the ideas set out above, an array of microphones could be used to listen to speech from a particular person and an array of loudspeakers could be used to direct sound to the same person so that the person can have a private conversation with a remote party despite the presence of other people in the zone.

In another example set of embodiments, the loudspeakers are used to transmit ultrasound signals and the microphones are used to receive reflections thereof. This could be used to determine the presence or position of an object or person in the zone.

In a further example set of embodiments which are a variant on those mentioned above, the receiver devices receive both audible sound and ultrasound such that once a person is located using the ultrasound, this can be used to steer the beamforming of received audible sound so that the person can be isolated for the purpose of receiving speech from them. This might enable person-specific voice control. In another set of embodiments, the location of a person could be used to provide context to a voice command automatically. For example if a person says "turn on" in front of a television, the television could be turned on automatically.

In another set of embodiments the transmitters comprise radar transmitters—e.g. ultra-wideband radar transmitters and the receivers comprise corresponding radar receivers. These can also be used effectively to determine the presence or location of an object as known per se.

The transmitter devices need not all be the same as each other. Similarly the receiver devices need not all be the same as each other. Where two or more types of transmitter/receiver are employed, they may work together to form an integrated phased array or each type may form its own independent phased array.

Each receiver device may comprise a single receiver. In a set of embodiments however each receiver device comprises an array of receivers (i.e. plurality of receivers with a common predetermined mutual spacing). This 'array of arrays' may help to resolve ambiguities in arrival direction for signals where the receiver devices are relatively spaced apart.

Similarly each transmitter device may comprise a single transmitter but in a set of embodiments each transmitter device comprises an array of transmitters (i.e. plurality of transmitters with a common predetermined mutual spacing).

The devices are typically spatially distributed around the zone. They may for example be spaced equally around the boundaries of the zone. They may be distributed horizontally, vertically or both. The zone could be any size and shape. The zone could be an outdoor zone, but in a set of embodiments the zone comprises an indoor zone—e.g. an enclosed space such as a room, hall, chamber or the like. Conveniently the devices are fixed to or integrated into the wall and/or ceiling of a room. In a set of embodiments the received signals are processed to determine a shape and/or dimensions of the room. This could be useful for calibrating audio reproduction, indoor positioning systems etc.

The received signals from all of the receiver devices could be processed. However in a set of embodiments only signals from a subset of the receiver devices are processed. The could allow a power saving by taking account only of signals likely to be relevant. The subset could be selected based on any of a number of factors—e.g. a determined position of a person in the zone, a user selection, a time factor (e.g. to allow a 'scan') or a parameter associated with the received signals such as signal strength or signal-to-noise ratio.

The received signals which are processed could be just those received directly from a sound source in the zone. However in a set of embodiments, reflections thereof, e.g. from walls and/or ceilings, are also used.

In accordance with the first aspect of the invention, the received signals are processed using at least one phase difference therebetween. Conveniently at least some of the receiver devices comprise a wireless data transmission subsystem to allow data relating to the received signals to be transmitted to a processing subsystem. The processing subsystem could be provided by another receiver device such that the receiver devices form one or more groups of two or more receiver devices which can process their signals. In a set of embodiments the processing subsystem is provided by a hub which comprises a data reception subsystem for receiving said data relating to the received signals. The hub may be common to all or a subset of the receiver devices.

In accordance with the second aspect of the invention the transmitted signals have at least one phase difference therebetween. Conveniently at least some of the transmitter devices comprise a wireless data reception subsystem to allow data relating to the signals for transmission to be received from a source subsystem. The source subsystem could be provided by another transmitter device such that the transmitter devices form one or more groups of two or more transmitter devices or to facilitate a relay or 'multi-hop' arrangement. In a set of embodiments the source subsystem is provided by a hub which comprises a data transmission subsystem for transmitting said data relating to the signals to be transmitted. The hub may be common to all or a subset of the transmitter devices.

The wireless data transmission and reception subsystems mentioned above (in accordance with both aspects of the invention) could be arranged to transmit/receive data using the same primary medium that the transmitter/receiver devices employ. For example, where the transmitter devices comprise loudspeakers they could be arranged to encode data on sounds they emit for reception by a microphone on the hub. In a set of embodiments however, an independent wireless data communication channel is used. In a set of embodiments the independent wireless data communication channel comprises radio signals—e.g. WiFi™, Bluetooth™ etc. It could also use optical communication, using the same signal path as is used for charging, or another, parallel or independent optical channel for communication.

In a set of embodiments where both transmitter and receiver devices are provided (either separately or integrated) the hub for each is conveniently the same.

Conveniently the hub is located in a common housing with the charging unit. Such a hub could carry out all processing or may carry out some initial processing with the results thereof transmitted to a remote server—e.g. one in the cloud. Similarly it may receive individual signals for transmitters or calculate these. The hub may therefore have independent wired or wireless network connectivity—e.g. WiFi, Ethernet, LTE etc.

As used herein the term 'phase difference' is to be understood as referring to a timing offset between two signals which is or can be measured to a degree of precision of less than a full period of either signal at a specific frequency (although differences between the signals which include multiple full periods may also be relevant) which may be expressed in terms of time, angle, fractions of a wavelength etc.

Certain embodiments of the invention will now be described, by way of example only, with reference to the accompanying drawings in which.

Figure 1:
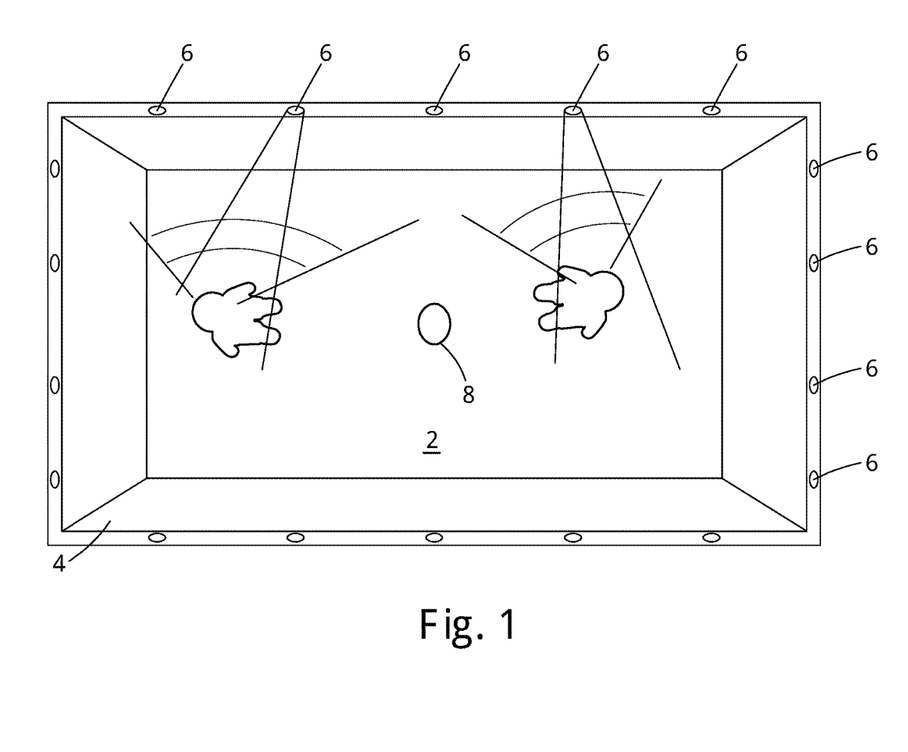
FIG. 1 is a schematic plan view of a room in which a system in accordance with an embodiment of the invention is fitted.

FIG. 1 shows in plan view a room 2 defined by walls 4. The ceiling of the room is omitted for clarity. Spaced around the walls 4, at their upper portions, are an array of transmitter/receiver devices 6 so that the room defines a zone which is surrounded by the devices 6, also referred to herein as 'nodes'. The nodes 6 are evenly distributed along a given wall 4 although they are shown as being more closely spaced along the two shorter walls. A central hub unit 8 is mounted in the middle of the ceiling and is provided with a mains power connection.

Figure 2:
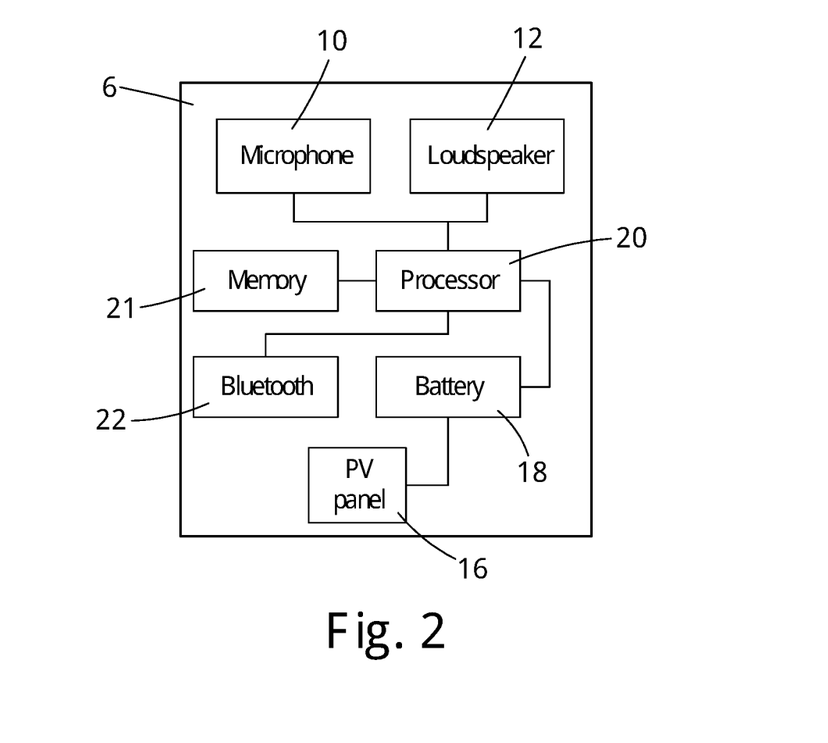
FIG. 2 is a block diagram of a transmitter/receiver device used in the system shown in FIG. 1.
Figure 3:
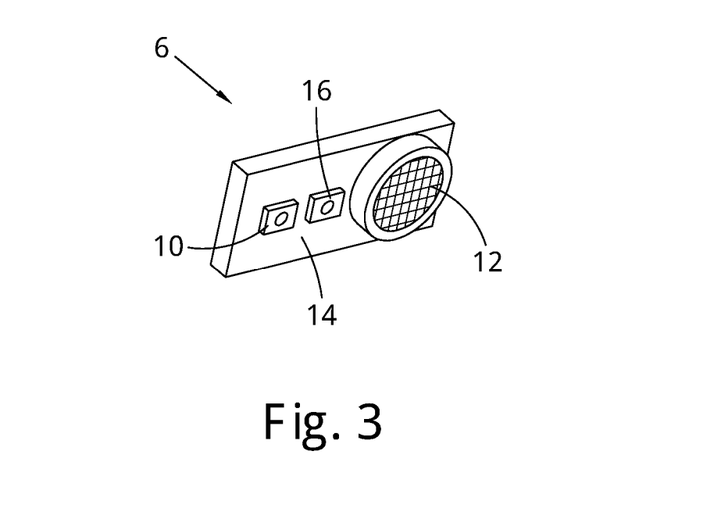
FIG. 3 is a representation of the transmitter/receiver device of an embodiment of the invention.

FIGS. 2 and 3 show one of the transmitter/receiver nodes 6 in more detail. The node 6 shown in this example is for the transmission and reception of audible sound and thus comprises a microphone 10 and a loudspeaker 12. Although these could have some directivity, this is not particularly required as the nodes 6 are used together in a phased array to provide beamforming as will be described later. The microphone and loudspeaker may therefore be omnidirectional and therefore potentially be of lower cost or greater performance. Any suitable type of microphone and loudspeaker could be used depending on the requirements of the particular application.

The other item visible on the housing 14 of the transmitter/receiver node is a small photovoltaic panel 16, e.g. the C30665GH available from Excelitas which is connected to an internal rechargeable battery 18. In practice this connection would be controlled by a battery management module which is omitted in this diagram for clarity.

The node 6 also includes a microprocessor 20 which receives signals from the microphone 10 and provides signals to the loudspeaker 12. Again, in practice, suitable amplifying and filtering circuits would be provided, but these are omitted for clarity. The processor 20 is also connected to a memory 21 and a Bluetooth transceiver 22 which allows data communication with the central hub unit 8.

Figure 4:
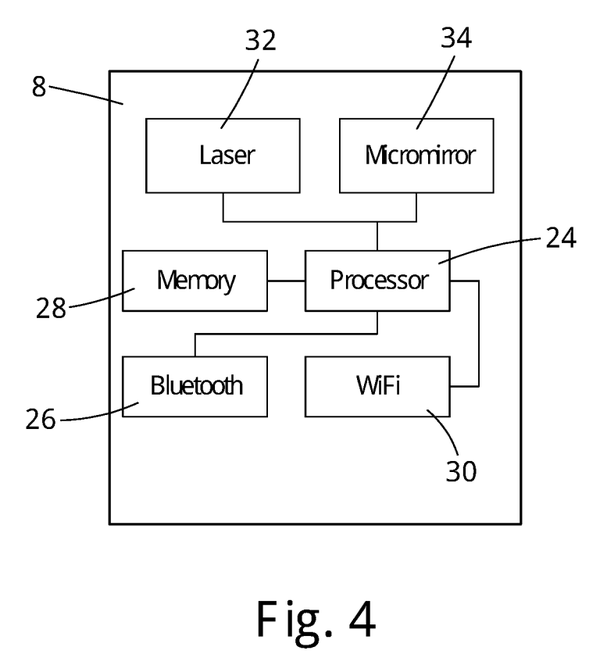
FIG. 4 is a block diagram of the central hub of the system of FIG. 1.

Turning to FIG. 4, there may be seen a block diagram of the main components of the central hub unit 8. This also includes at least one processor 24 which is connected to a Bluetooth transceiver 26 to allow data communication with the transmitter/receiver nodes 6 as previously discussed. The processor 24 is also connected to a memory 28 and to a WiFi module 30 which allows it to connect to a WiFi network of the building containing the room 2 to which the system is fitted. This enables communication with the internet for passing on or receiving data.

The central hub unit also comprises a laser light generator 32 such as the TO9-154-161 available from Seminex and a steerable micro-mirror 34 which comprises a MEMS structure with at least two independent actuators operable to tilt the mirror against a resilient bias force in each of two independent directions in order to steer a beam of laser light emanating from the laser light generator 32 in a range of directions.

Figure 10:
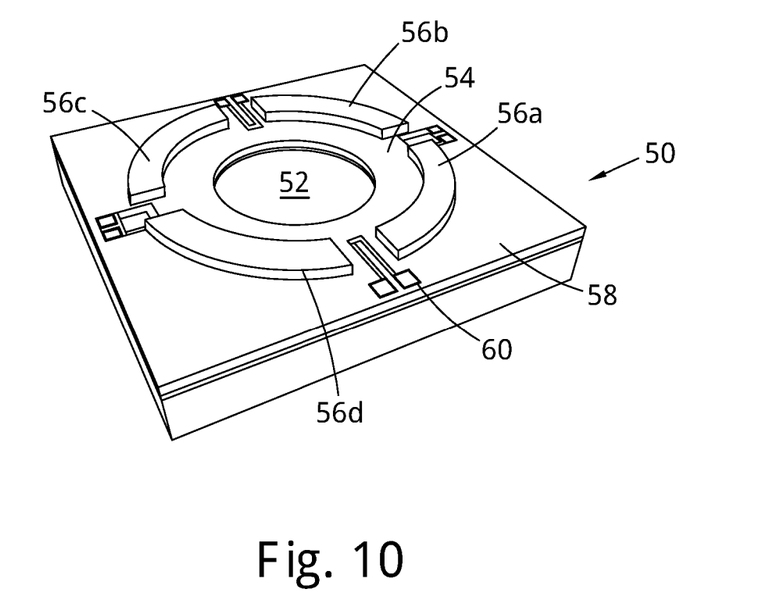
FIG. 10 is a detailed view of a micro-mirror which can be used in accordance with the invention.

One example of a micro-mirror that can be used is shown in FIG. 10 and described in more detail in U.S. Pat. No. 9,250,418. FIG. 10 illustrates a MEMS micro-mirror 50 based on a ring shaped membrane 54 providing a coupling means between a rigid optical element 52 e.g. of silicon and a frame 58. An actuator is provided which is split around its circumference into four arcuate sections 56*a*, 56*b*, 56*c*, 56*d*. Corresponding inner actuator parts (not shown) are also provided. Piezo-resistors 60 are provided for position measuring. These piezo-resistors 60 are positioned in the gaps between the actuator sections.

The actuator sections 56*a*, 56*b*, 56*c*, 56*d* are positioned on the membrane 54 defining a coupling area between the frame 58 and the rigid element 52. The actuator sections 56*a*, 56*b*, 56*c*, 56*d* deflect the rigid element disc 52. The optical element 52 is rigid so as to maintain essentially the same shape when moved by the actuator elements 56*a*, 56*b*, 56*c*, 56*d*. The actuator elements 56*a*, 56*b*, 56*c*, 56*d* are preferably positioned close to either the frame 58 or the rigid element 52, so that when the piezoelectric material contracts, the part of the actuator positioned on the membrane is bent upward thus pulling the membrane in that direction.

A number of laser and micro-mirror parings may be provided to give full 360° coverage around the room. The laser 32 and micro mirror 34 may be controlled by the processor 24 or a separate controller unit might be provided.

Figure 5A:
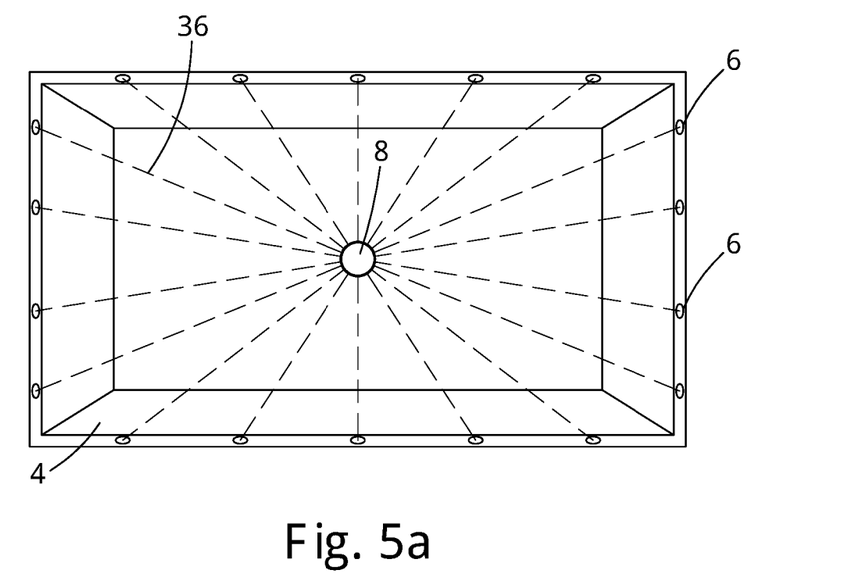
FIGS. 5*a* to 5*c* are two plan views and a partial perspective view showing the charging mode of the system and Bluetooth™ communication.
Figure 5B:
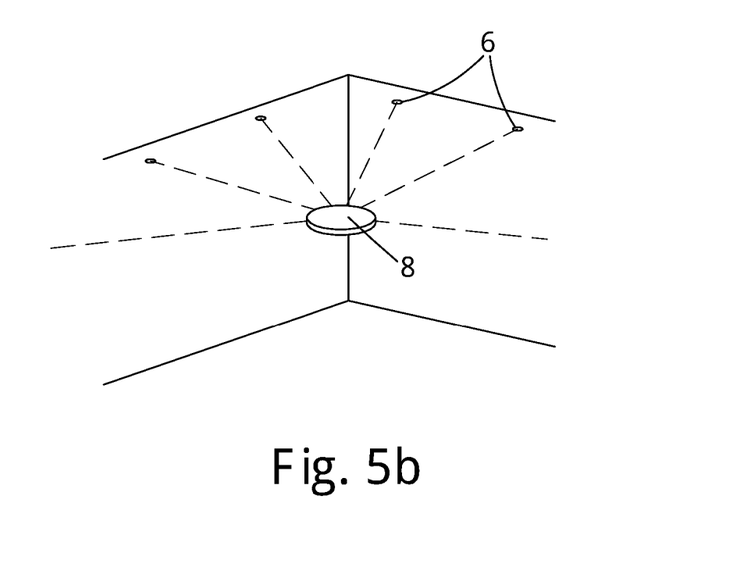
Figure 5C:
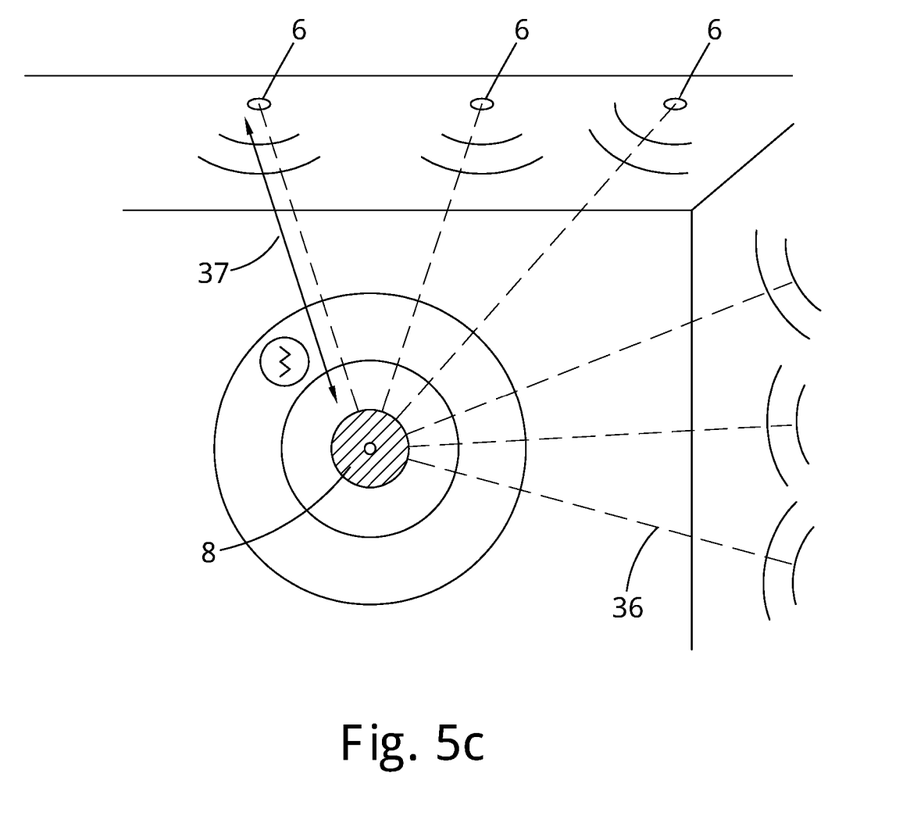

FIGS. 5*a*, 5*b* and 5*c* show how the central hub unit 8 can charge each of the transmitter/receiver nodes 6 which are distributed around the room, fixed to the walls 4. This is done by directing a beam of laser light 36 to the respective photovoltaic panels 16 at each node 6 thereby generating a current which is used to charge their internal battery 18. Although these Figures show beams 36 being transmitted simultaneously to the nodes 6, in practice a single beam may be directed at each node in turn in a cycle. This could be done by directing the beam at a given node 6 until the battery is fully charged and then moving on to the next, or the beam 36 could simply be moved sequentially around the nodes so that they are all charged at a similar rate.

The availability of a data communication channel 38 over Bluetooth™, as previously described and shown in FIG. 5c, enables feedback from the individual node 6 to the central hub unit 8 regarding its level of charge which could be used, for example, to prioritise those nodes which are low on charge. It could also be used as part of a feedback mechanism to confirm that there is proper alignment between the laser beam 36 and the photovoltaic panel 16 of a given node. This could allow the hub 8 to compensate for any gradual drift in alignment or it could be used, for example, to trigger an alert if the photovoltaic panel 16 is not illuminated when it should be, e.g. because of a blockage in the light path.

The data communication channel 38 is of course also used during the phased array operation, not just during charging.

Figure 6:
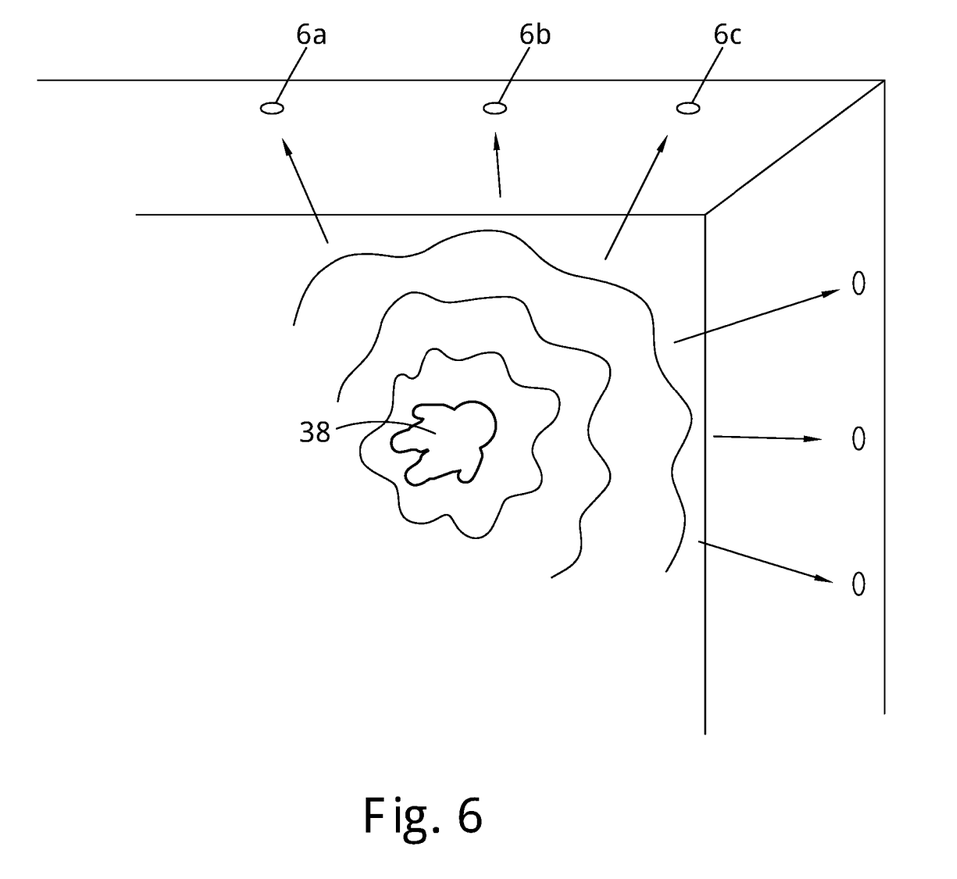
FIG. 6 is a schematic representation of a number of nodes receiving speech from a user.

FIG. 6 shows a person 38 located in the room 2 who is generating sound by speaking which is picked up at, for example, three separate nodes 6a, 6b, 6c using their respective microphones 10. As will be appreciated by those skilled in the art, since the signal path lengths from the person 38 to the respective nodes 6a, 6b, 6c differ, there will be a phase difference in the signals received at each node. By using knowledge of where the person 38 is located within the room, e.g. using one of the techniques which will be described later, only sounds having the correct relative phase differences, and therefore emanating from the person 38, may be used, with other sounds, e.g. from elsewhere in the room, being suppressed. This will be described in greater detail below.

Figure 7:
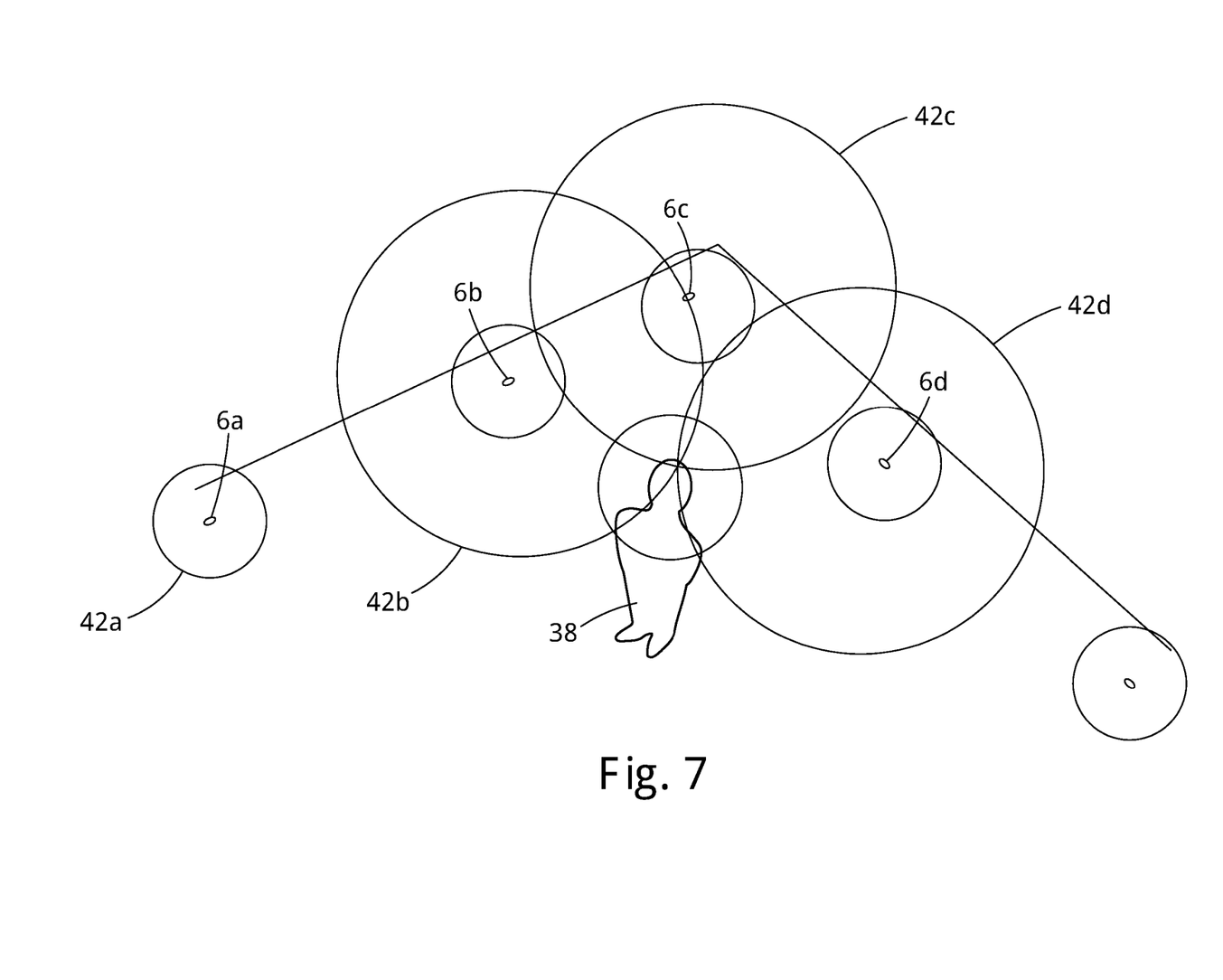
FIG. 7 is a schematic representation of a number of nodes directing sound at a particular user.

FIG. 7 shows similarly how sounds may be targeted at a particular person 38 in the room by transmitting suitable signals 44b, 44c, 44d from the loudspeakers 12 of respective nodes 6b, 6c, 6d with appropriate phase offsets from one another.

Figure 8:
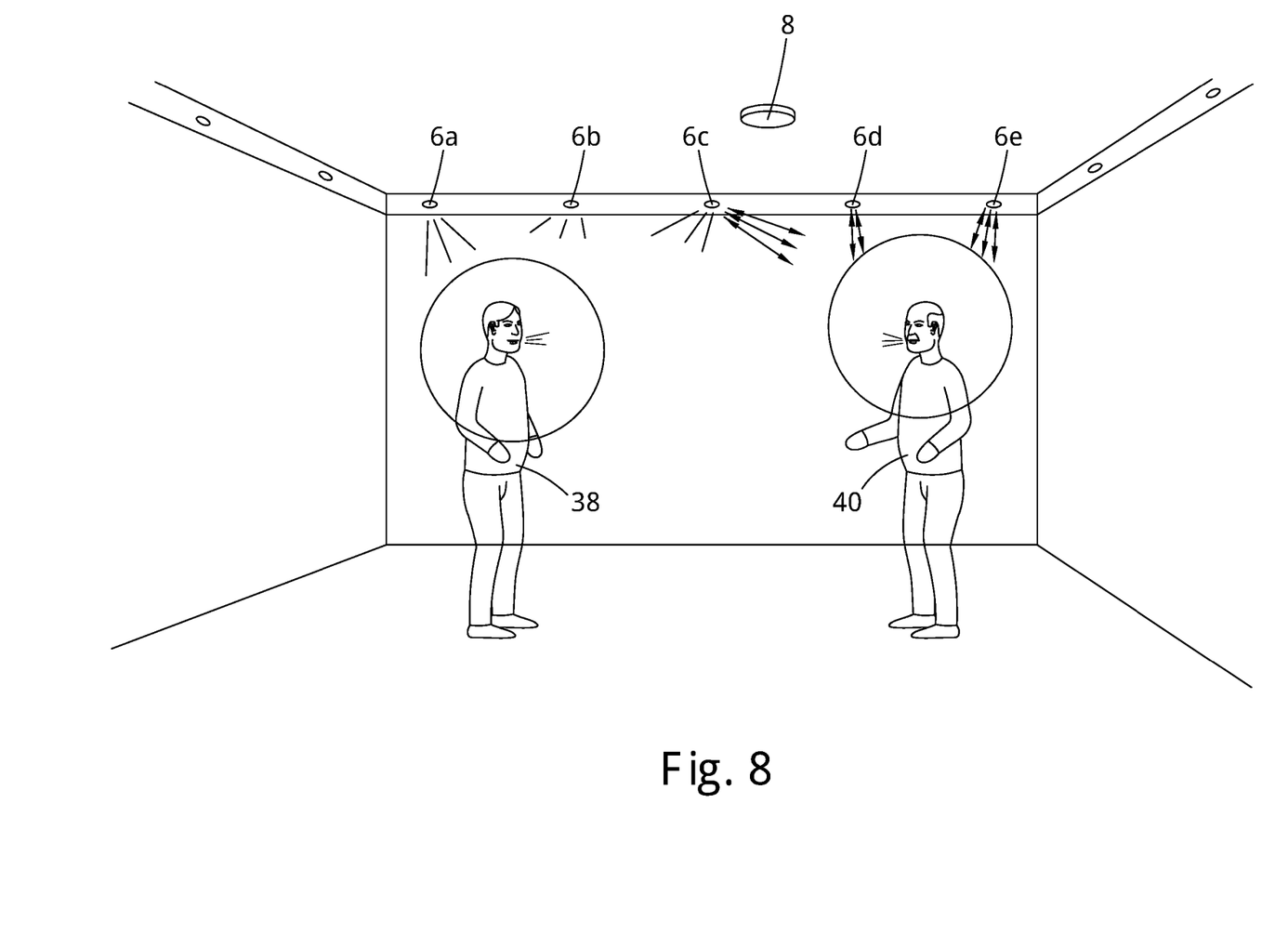
FIG. 8 is a schematic representation of one use of the system to allow two separate people to engage in independent conversations with remote parties.
Figure 9:
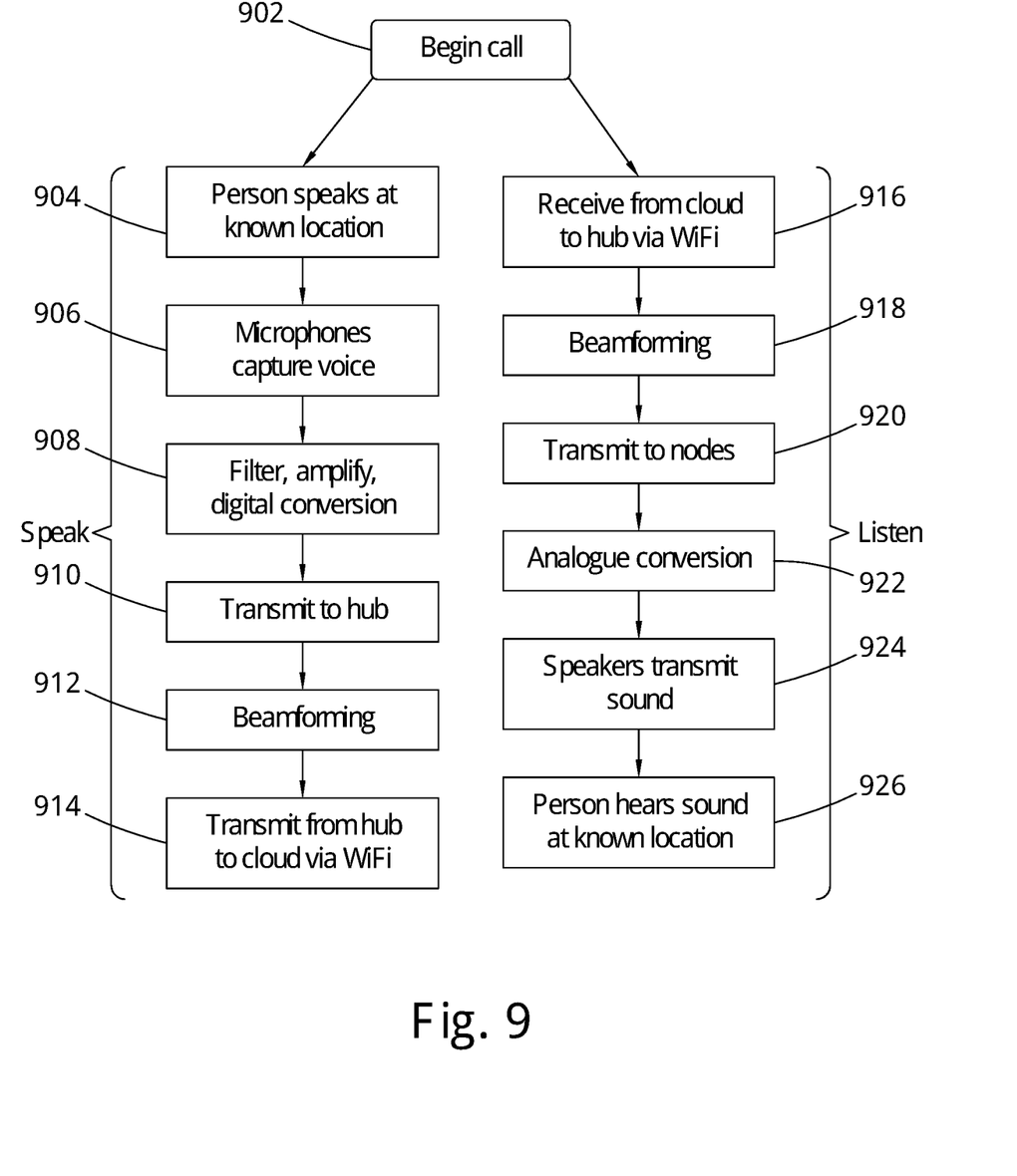
FIG. 9 is a flow chart showing operation of a system in accordance with an embodiment of the invention.

FIGS. 8 and 9 illustrate how a particular individual 38 in the room might be able to have a "private" voice conversation with a remote party, e.g. using a Voice over IP (Vol P) service provider whilst a second person in the room 40 conducts an independent conversation with a different remote party. Here it is illustrated that the first person 38 may be picked up by and receive sounds from three of the nodes 6a, 6b, 6c with suitable phase differences allowing beamforming of transmitted and received sounds to the first person 38. The second person 40 is also shown interacting with three of the nodes 6c, 6d, 6e which also employ suitable phase differences to achieve beamforming and it will be appreciated of course that the phase difference applied by the common node 6c will be different for the sound to/from the first person compared to the sound to/from the second person 40. Of course more or all of the nodes could be used in practice for multiple independent conversations following this principle.

FIG. 9 is a flow chart showing the steps required to conduct an independent "private" voice call between an individual in a room and a remote party. For either of the people 38, 40 in the room, the process starts by initiating a call at step 902 which could be done in any number of ways, e.g. through touching a screen on the wall or on a device in the room (not shown), a smart-phone app, a voice command or a gesture. The person may then begin speaking in a normal or even low voice at step 904 from a known location in the room. Then at step 906 microphones from several of the nodes 6 capture the audio data and at step 908 perform initial processing of it, e.g. filtering, amplification, digital conversion, etc.

At step 910 the nodes then transmit their individual digital signals to the central hub 8 via their Bluetooth™ connection at step 908. At step 912 the central hub determines the phase differences of the respective signals and applies beamforming to isolate the signals corresponding to the relevant person given their known location. As will be appreciated, because the same sound is received by a number of the nodes, an improvement in SNR is achieved over receiving the sound using one node/microphone. The isolated digital data stream corresponding to that particular person is then transmitted over the WiFi connection at step 914 to a remote server operating a VoIP service.

On the 'Listen' side, VoIP data from the VoIP service is received over WiFi at step 916 and this is processed by the processor 24 in the central hub to carry out beamforming at step 918 to determine phase offsets to be applied to the respective signals from a number of transmitters. Then at step 920, the respective signals are transmitted via Bluetooth™ to the nodes 6 and at step 922 they are converted to analogue signals. The sounds can then be transmitted by the speakers at step 924 as shown in FIG. 7. At step 926 the sound is heard by the intended person only at the known location. By carrying out a similar process for each of the two individuals 38, 40 in the room, they may therefore have separate, independent private conversations without disturbing the other.

As mentioned above, the beamforming algorithms employed in these embodiments require knowledge of the position of the target in the room. This may be obtained in a number of ways. It could be obtained by a separate system, e.g. a camera and image analysis software, or by using the nodes themselves—e.g. to perform a sweep and determine where a strongest sound source is located. In another alternative, which could either be employed in conjunction with the nodes described with reference to the previous Figures or could be used as a different application of the principles of the invention, a number of nodes transmit and receive short range ultra wide band radar signals. These signals impinge on a target (in much the same manner as the sound signals shown in FIG. 7) which generates reflections received by the respective transmitting nodes as well as, potentially, other nodes.

By comparing the respective times of flight of the signals transmitted and received by the respective nodes, the position of the target can be determined by simple triangulation.

Further details of the processing applied to the signals received by the microphones and the signals driving the loudspeakers will now be provided.

For the sake of example it will be assumed that there are N nodes around the room which are being charged by laser. Each node contains a transmitter (speaker) and a receiver (microphone).

As discussed above the objective of the arrangement shown in FIGS. 6 and 7 is to detect and amplify the speech from one specific person 38 speaking in the room, and also to transmit audio 'directionally' back to the same person 38. There may be multiple people in the room 38, 40, each having their own "private transmit/receive channel" as shown in FIG. 8.

Considering first reception as shown in FIG. 6, it is assumed that the location of the target person 38 speaking in the room is known (e.g. using one of the approaches described above), and that the speed of sound c is known. The location of the nodes 6 (transmitters and receivers) are also known of course as they are affixed to the walls of the room. Those positions could be estimated initially via the positioning scanning of the laser, their exact position could be manually or automatically input to the computing system (via e.g. a 3D camera with absolute measuring capabilities) or they could be estimated 'blindly' or 'semi-blindly' from signal processing algorithm. Such methods are well known in the art, see e.g. http://www.bebec.eu/Downloads/BeBeC2010/Papers/BeBeC-2010-15.pdf Given the position of the target person 38 in the room, p=[x, y, z], and the position of all the microphones are $x_1$, $x_2$, $x_3$, ... $x_N$, the expected time of flight between the target at position p and each of the microphones can be computed, via the formula s=v*t (distance equals speed times time), as $$\Delta_i = \frac{1}{c}\|x_i - p\| \quad [\text{Eq. 1}]$$

where c (or v) is the speed of sound. Assuming the target person 38 is the only active audio source in the room, the received signals $y_1(t)$, $y_2(t)$, $y_3(t)$, ... $y_N(t)$ can be expressed as:

$$y_i(t) = s(t-\Delta_i) + n(t)$$

Where s(t) is the "spoken word", i.e. the sound produced by the target person, and n(t) is the sensor noise. An alternative way of expressing this is $$y_i(t) = s(t)*\partial(t-\Delta_i) + n(t)$$

Where $\partial(t)$ is the delta dirac functions. Both equations essentially say that each microphone receives an appropriately time-delayed version of the sounds output from the target person. For simplicity of explanation, no attenuation term has been included—e.g. arising though damping of sound as a function of spherical or non-spherical spread of energy and relaxation mechanisms in air typical above 40 Khz for sound—but they can be readily incorporated as will be appreciated by those skilled in the art.

A way to recover signal-of-interest s(t) is by delaying-and-summing, i.e.

$$\hat{s}_i(t) = \sum_{i=1}^{N} y_i(t)*\partial(t+\Delta_i) = \sum_{i=1}^{N}[s(t)*\partial(t-\Delta_i)+n(t)]*\partial(t+\Delta_i) = \quad [\text{Eq. 2}]$$

$$\sum_{i=1}^{N} s(t)*\partial(t-\Delta_i)*\partial(t+\Delta_i)+n(t)*\partial(t+\Delta_i) =$$

$$\sum_{i=1}^{N} s(t)+n(t)*\partial(t+\Delta_i) = N \cdot s(t) + \sum_{i=1}^{N} n(t)*\partial(t+\Delta_i)$$

Where the first part becomes an amplification of the source s(t) (added up N times) and the second part becomes a sum of incoherent noise components, i.e. the parts of the noise component that do not sum up constructively. The overall result is an amplification of the signal-to-noise ratio via delay-and-sum beamforming. In the frequency domain, this could be expressed as:

$$Y_i(\omega) = S(\omega)*D_i(\omega) + N(\omega) \quad [\text{Eq. 3}]$$

where $D_i(\omega)$ is the phase delay associated with the time delay for the specific frequency $\omega$. Note that $D_i(\omega)$ has unit modulo (i.e. it only phase delays the signal, it does not amplify or attenuate it in accordance with the assumption explained above. In the frequency domain, the delay-and-sum recovery strategy thus becomes:

$$\hat{S}(\omega) = \sum_{i=1}^{N} Y_i(\omega) D_i(\omega)^* \quad [\text{Eq. 4}]$$

where the effect of $D_i(\omega)^*$ is to cancel out the effect of $D_i(\omega)$, to once again get an amplification of the signal relative to the noise. This gives rise to the term phased array, i.e. the phase information in some or all frequency bands is used constructively to recover the signal of interest. Note also, that, in the case of an interfering signal being added to the mix, i.e.

$$Y_i(\omega) = S(\omega)*D_i(\omega) + Z(\omega)*F_i(\omega) + N(\omega) \quad [\text{Eq. 5}]$$

If $Z(\omega)$ is the interfering signal originating at some other location q and being delayed towards each of the microphones 10 via the individual time delay represented as $F_i(\omega)$, then the same delay-and-sum strategy would also serve to reduce the effect of the interfering signal in the output result relative to the signal of interest, i.e. the strategy would use the phase knowledge to improve the signal-to-noise-and-interference ratio.

Other more sophisticated techniques existing for signal source enhancement. Some take into account the positions and/or statistical acoustic properties of interfering source i.e. not simply smear the out to reduce their impact, as in the above example. Minimum Variance Distortionless receiver (MVDR) or Capon beamforming, is but one example.

Moreover, if the acoustic transfer functions, or impulse responses from each source to each microphone are known, better results can be obtained, because impulse responses can take into account not merely the direct path of the sound from the person 38 towards each of the microphones 10, but also any subsequent echo coming from a sound impinging on a wall, ceiling or other object. Letting $H_{ij}(\omega)$ denote, in the frequency domain, the impulse frequency response from source j, j=1, ... Q, to microphone number i, then we have, assuming $S_j(\omega)$ to be the source signal from the j'th source:

$$Y_i(\omega) = \left[\sum_{i=1}^{Q} H_{ij}(\omega) S_j(\omega)\right] + N_i\omega \quad [\text{Eq. 6}]$$

This can be put into vector-matrix notation by stacking the successive microphone inputs in a vector as:

$$Y(\omega) = H(\omega)S(\omega) + N(\omega) \quad [\text{Eq. 7}]$$

Here $H(\omega) = \{H_{ij}(\omega)\}$, $S(\omega) = [S_1(\omega), \ldots S_Q(\omega)]^T$, $Y(\omega) = [Y(\omega), \ldots Y_N(\omega)]^T$ and $N(\omega) = [N_1(\omega), \ldots N_N(\omega)]^T$. A similar formulation exists in time-domain where the effect of the impulse responses in the time-domain, i.e. $h_{ij}(t)$ (which are convolved with the source signals $s_{ij}(t)$) build up a block Toeplitz matrix system. Whether used in the time or frequency domain, any of the following techniques can equally well be used: Minimum Mean Square Error (MMSE) receiver strategies, Blind Source Separation or Independent Component Analysis, Blind Source Separation approaches utilizing statistical properties related to the signal-of-interest, Sparse methods such as Bayesian models with Gaussian Mixture Models or L1-based regularization methods such as in compressed sensing, or any other suitable technique that utilizes phase information.

The impulse responses can be estimated blindly, see e.g. https://www.eurasip.org/Proceedings/Eusipco/Eusipco2015/papers/1570099235.pdf As discussed previously herein, each transmitter/receiver node device 6 could have an array of microphones instead of a single microphone 10. In this case the above reasoning could be used for "an array of arrays". This can be particularly useful in some situations: If the spacing between each (single) device 6 is too big, then when looking at the set of devices as an array may result in "grating lobes", which in effect means that there are multiple sets of incoming wave directions that could lead to the same set of microphone array responses, i.e. an ambiguity in the wavefield composition. The effect for beamforming algorithms and the like may be that waves coming from certain directions are indistinguishable from waves from some other directions, meaning that they cannot be successfully separated. In this case, replacing the single microphone of each device by an array, can reduce the effect of grating lobes substantially.

Turning now to transmission as shown in FIG. 7, it is similarly assumed that the locations of the loudspeakers 12 at each of the node devices 6 are known (as for the microphones above) and that the location of the target 38 is also known. Then, the time-delays used above can be used to define each output signal $s_1(t)$ to be output from loudspeaker j as:

$$s_j(t)=s(t)*\partial(t+\Delta_j)$$ [Eq. 8]

In which case, the signal received at the position of the target person 38 would be:

$$y(t) = \sum_{i=1}^{N} s_j(t) * \partial(t-\Delta_j) = \sum_{i=1}^{N} s(t) * \partial(t+\Delta_j)\partial(t-\Delta_j) =$$
$$\sum_{i=1}^{N} s(t) * \partial(t) = \sum_{i=1}^{N} s(t) = Ns(t)$$ [Eq. 9]

i.e. an amplification of the signal at the focus point p. If the person 38 moved to another location p', then there would not be the same amplification, because the terms $\partial(t+\Delta_j)\partial(t-\Delta_j)$ would be replaced by $\partial(t+\Delta_j)\partial(t-\tau_j)$ for some $\tau_j$ which would generally not combine to become a(t). Instead, the effect would be a "smearing out" of the outputs and effective lowering of the N-time amplification observed at p. A parallel argument can be made in the frequency domain, making it apparent that the system is relying on phase delays of the transmit signals to obtain the local focusing effect.

Also on the transmit side, it is possible to utilize detailed knowledge of the impulse response function to create even better focusing utilizing reflectors like walls and ceiling or other large objects. For instance, if $h_{ij}(t)$ is the impulse response between each transmitter j and each target I, then the sound received at each target i can be jointly modelled as:

$$\begin{bmatrix} y_1(t) \\ \vdots \\ y_Q(t) \end{bmatrix} = \begin{bmatrix} H_{11} & \cdots & H_{1N} \\ \vdots & \ddots & \vdots \\ H_{Q1} & \cdots & H_{QN} \end{bmatrix} \begin{bmatrix} s_1(t) \\ \vdots \\ s_N(t) \end{bmatrix}$$ [Eq. 10]

Or $$y = Hs$$

The matrices $H_{ij}$ are the aforementioned Toeptliz matrices containing the impulse responses $h_{ij}(t)$ as its shifted rows, $s_j(t)$ is the sampled vector to samples output from speaker j, and $y_i(t)$ the sound that is received at the i'th target location. It is now possible to select transmit signals $\{s_j(t)\}$ so that the received signals become "the desired ones", i.e. that a specific sound is observed at some location I and an entirely different sound at location j—even though the original transmit signals $\{s_j(t)\}$ all contain mixes of those specific sounds. One straightforward example is to let=$H^+y$, where $H^+$ denotes the Moore-Penrose Inverse of H. More sophisticated techniques capable of dealing with noise robustness can be envisaged too. Note that in the above, the entire impulse response, i.e. not just the direct time-of-flight path, can be utilized for audio focusing.

Again, it is sometimes useful to have "arrays of arrays" at the transmitter side to avoid problems with grating lobes.

Both on the transmitter and the receiver side, it is generally possible to "shape the sharpness" of the focus point at desire. This could be useful e.g. if a person is moving while speaking in the room and the exact location of the person is not therefore known at any moment 100%. Then, having a slightly broader focus lobe, at the cost of maximum focus in one point makes sense. Techniques for widening or shortening such lobes are well known in array signal processing, see e.g. http://przyrbwn.icm.edu.pl/APP/PDF/119/a119z4p01.pdf The transmit and receive side operations can jointly benefit from one another. For example, the microphone beamforming can be used to infer the position of a speaker, which is useful for transmit beamforming.

It will be seen that the embodiments described above give just a few examples of how having an array of transmitters and/or receivers distributed throughout a room can give rise to many powerful applications where the signals can be used together so that the devices form a phased array and where the devices can all be charged at a distance by the laser in the central hub. This makes such an arrangement practicable and provides a strong synergistic effect between the two technologies. It will appreciated by those skilled in the art that there are many other applications possible in accordance with the invention which use either transmission, reception or both of signals of any other wide variety of type to allow rich interaction with systems either locally or remotely or to determine information about the room or other zone in which the devices are employed.

The invention claimed is:

1. A system comprising an array of receiver devices arranged to operate as a phased array, wherein said receiver devices are in a fixed mutual relationship within a zone and each receiver device comprises a photovoltaic element, said system being arranged to receive a signal from within the zone at a plurality of said receiver devices to generate a plurality of received signals and to process said received signals using at least one phase difference therebetween, said system further comprising a unit located within the zone arranged to direct at least one beam of light to said photovoltaic elements, thereby providing power to said receiver devices.

2. The system as claimed in claim 1, wherein each receiver device comprises an array of receivers.

3. The system as claimed in claim 1, wherein the receiver devices are fixed to or integrated into a wall and/or ceiling of a room, and wherein the system is configured to process the received signals to determine at least one of the group comprising: an acoustic transfer function of the room, an impulse response of the room, a shape of the room, or dimensions of the room.

4. The system as claimed in claim 1, wherein at least some receiver devices of the array of receiver devices comprise a wireless data transmission subsystem to allow data relating to the received signals to be transmitted to a processing subsystem, and wherein the processing subsystem is provided by another receiver device of the array of receiver devices such that the array of receiver devices forms one or more groups of two or more receiver devices which process their received signals.

5. The system as claimed in claim 1, further comprising an array of transmitter devices arranged to operate as a phased array, wherein said transmitter devices are in a fixed mutual relationship within said zone and each transmitter device comprises a photovoltaic element, said system being arranged to transmit a plurality of transmitted signals into the zone from a plurality of said transmitter devices wherein said transmitted signals have at least one predetermined phase difference therebetween, wherein said unit located within the zone is further arranged to direct at least one beam of light to said photovoltaic elements of the transmitter devices, thereby providing power to said transmitter devices.

6. The system as claimed in claim 5, wherein the receiver devices comprise microphones and the transmitter devices comprise loudspeakers, and wherein the array of microphones is configured to listen to speech from a person and the array of loudspeakers is configured to direct sound to said person.

7. The system as claimed in claim 5, wherein the receiver devices comprise microphones and the transmitter devices comprise loudspeakers, and wherein said loudspeakers of the transmitter devices are configured to transmit ultrasound signals and said microphones of the receiver devices are used to receive reflections of the ultrasound signals;
wherein the system is configured to locate a person using said ultrasound signals; and
wherein the receiver devices are configured to receive both audible sound and ultrasound signals such that once a person is located using the ultrasound signals, the system is configured to steer a beamforming of received audible sound signals.

8. The system as claimed in claim 7, configured to use a location of a person to provide context to a voice command automatically.

9. The system as claimed in claim 5, wherein the transmitter devices and receiver devices are fixed to or integrated into a wall and/or ceiling of a room.

10. The system as claimed in claim 5, wherein at least some of the transmitter devices comprise a wireless data reception subsystem to allow data relating to the signals for transmission to be received from a source subsystem and/or wherein at least some of the receiver devices comprise a wireless data transmission subsystem to allow data relating to the received signals to be transmitted to a processing subsystem.

11. The system as claimed in claim 10, wherein the source subsystem is provided by another transmitter device of the array of transmitter devices such that the transmitter devices form one or more groups of two or more transmitter devices to facilitate a relay arrangement and/or wherein the processing subsystem is provided by another receiver device of the array of receiver devices such that the receiver devices form one or more groups of two or more receiver devices which can process their received signals.

12. The system as claimed in claim 10, wherein the source subsystem is provided by a hub which comprises a data transmission subsystem for transmitting said data relating to the signals to be transmitted and/or wherein the processing subsystem is provided by said hub which comprises a data reception subsystem for receiving said data relating to the received signals.

13. The system as claimed in claim 5, comprising a wireless data communication channel comprising optical communication, using a same signal path as is used by the at least one beam of light for providing power to said transmitter devices.

14. The system as claimed in claim 1, wherein the array of receiver devices comprises two or more types of receiver devices arranged to work together to form an integrated phased array.

15. The system as claimed in claim 1, wherein the system is arranged to process only signals from a subset of the receiver devices and select said subset based on one or more of: a determined position of a person in the zone, a user selection, a time factor, or a parameter associated with the received signals.

16. The system as claimed in claim 1, wherein the system is arranged to process signals received as a result of reflections of sound signals generated by a sound source in the zone.

17. A system comprising an array of transmitter devices arranged to operate as a phased array, wherein said transmitter devices are in a fixed mutual relationship within a zone and each transmitter device comprises a photovoltaic element, said system being arranged to transmit a plurality of transmitted signals into the zone from a plurality of said transmitter devices wherein said transmitted signals have at least one predetermined phase difference therebetween, said system further comprising a unit located within the zone arranged to direct at least one beam of light to said photovoltaic elements, thereby providing power to said transmitter devices.

18. The system as claimed in claim 17, wherein each transmitter device comprises an array of transmitters.

19. The system as claimed in claim 17, wherein at least some transmitter devices of the array of transmitter devices comprise a wireless data reception subsystem configured to allow data relating to the signals for transmission to be received from a source subsystem, and wherein the source subsystem is provided by another transmitter device of the array of transmitter devices such that the array of transmitter devices forms one or more groups of two or more transmitter devices or to facilitate a relay arrangement.

20. The system as claimed in claim 17, wherein the array of transmitter devices comprises two or more types of transmitter devices arranged to work together to form an integrated phased array.

\* \* \* \* \*